May 7, 1957　　　　D. R. HAINES ET AL　　　　2,791,340
LOAD LIFTING IMPLEMENT FOR ATTACHMENT TO TRACTORS
Filed May 11, 1953　　　　　　　　　　　　4 Sheets-Sheet 1

INVENTORS
DAVID RALPH HAINES
WILLIAM HAROLD BENT
by Carlson, Pitzner
　　Hubbard & Wolfe Attys.

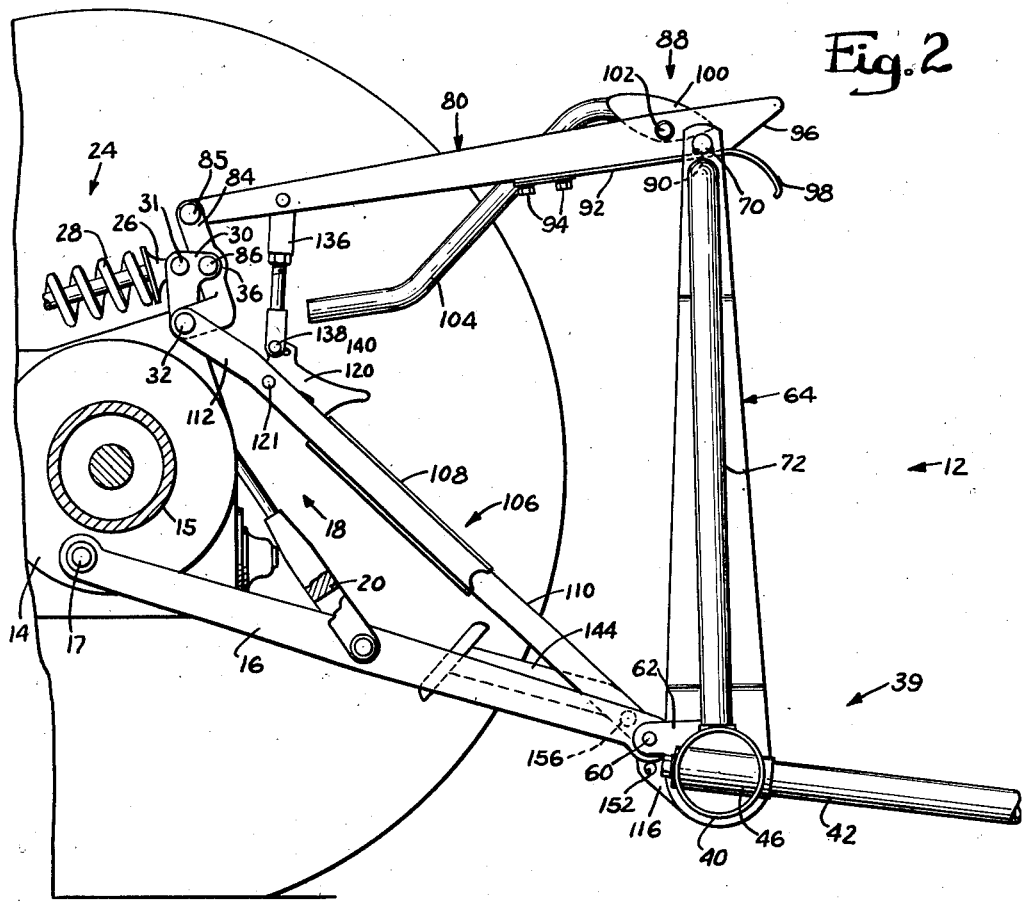
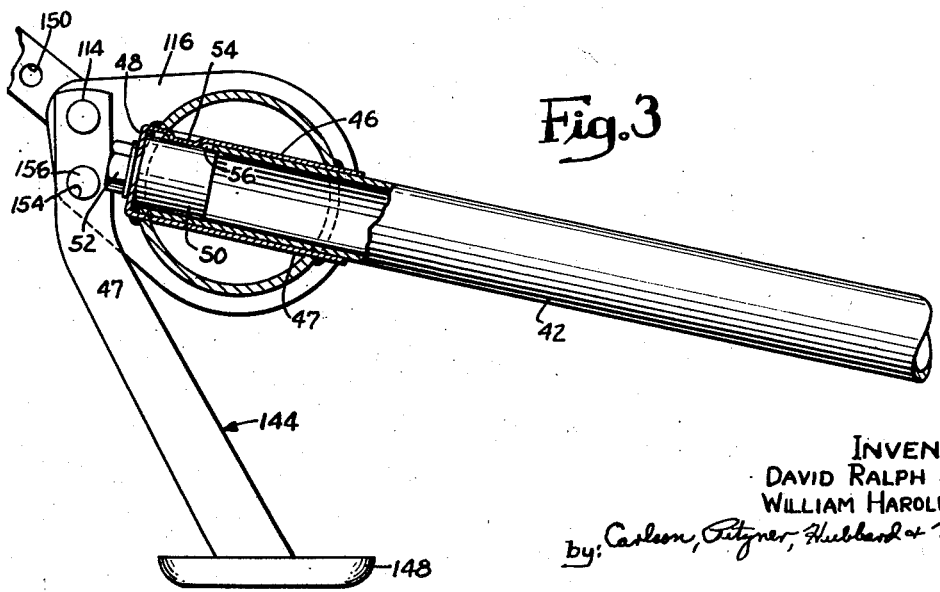

INVENTORS
DAVID RALPH HAINES
WILLIAM HAROLD BENT
by: Carlson, Pitzner, Hubbard & Wolfe
Attys

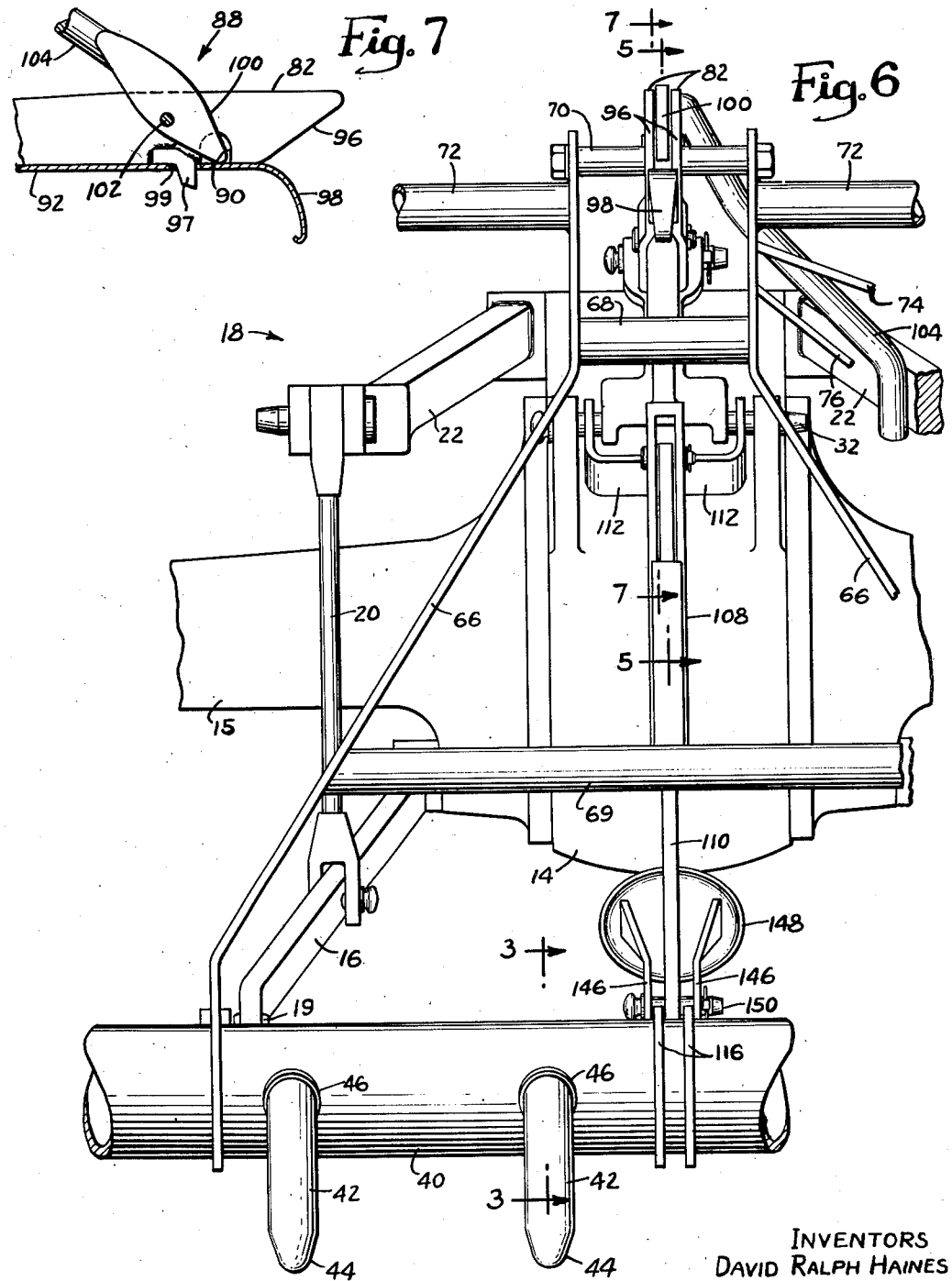

United States Patent Office 2,791,340
Patented May 7, 1957

2,791,340

LOAD LIFTING IMPLEMENT FOR ATTACHMENT TO TRACTORS

David Ralph Haines, Chapelfields, Coventry, and William Harold Bent, Leicester, England, assignors to Massey-Harris-Ferguson (Sales) Limited, a British company Application May 11, 1953, Serial No. 354,328

Claims priority, application Great Britain September 27, 1952

10 Claims. (Cl. 214—140)

This invention relates to load-lifting implements, such, for example, as sweep or buck rakes, and to means for attaching such implements to the rear ends of tractors, particularly those of the type having a hitch linkage operable by a power lift device.

A general object of the invention is to provide an improved rear end load-lifting implement of the type having a load-supporting element which may be thrust underneath a load, raised so as to lift the load, and then tilted so as to discharge the load.

A further object is to provide an improved arrangement for attaching a load-lifting implement of the foregoing character to the rear end of a tractor having a power lift device, so that the latter may be employed to lift the load. More particularly, it is a further object to provide means for attaching such a load-lifting implement to a tractor having trailingly pivoted draft links, so that the load may be lifted by raising the links with the power lift device.

Another object is to provide a load-lifting implement having an improved releasable latching mechanism for holding the load-supporting element in its normal, load-carrying position, subject, however, to be released by the operator when the load is to be dumped. A further and more particular object is to provide such a latching mechanism which, after being released, will automatically be re-latched when the load-supporting element is lowered into position to receive another load.

It is another object of the invention to provide a load-lifting implement having a mechanism for holding the load-supporting element in raised position so that the power lift device on the tractor may be relieved of the weight of the load. A more particular object in this regard is to provide means for automatically disabling the last-mentioned mechanism after the load has been dumped, so that the load-supporting element may readily be lowered into position to receive another load.

Another object is to provide means for supporting the load-lifting implement in a position such that it may readily be hitched and unhitched from the tractor.

It is still another object of the invention to provide a buck rake adapted to be attached to a tractor having an automatic draft control, and so constructed that the draft control will prevent excessive pressure between the tines of the rake and the surface of the ground.

Further objects and advantages of the invention will appear from the following description of an illustrative embodiment, taken with the drawings, in which:

Fig. 2 is a left side elevational view of the buck rake of Fig. 1, the left-hand rear wheel of the tractor being removed for clarity of illustration.

Fig. 3 is a fragmentary elevational sectional view taken along a line 3—3 shown in Fig. 6.

Fig. 6 is a fragmentary elevational view of the buck rake of Fig. 1, taken from the rear of the tractor.

Fig. 7 is a fragmentary elevational sectional view taken along a line 7—7 in Fig. 6.

Figure 1:
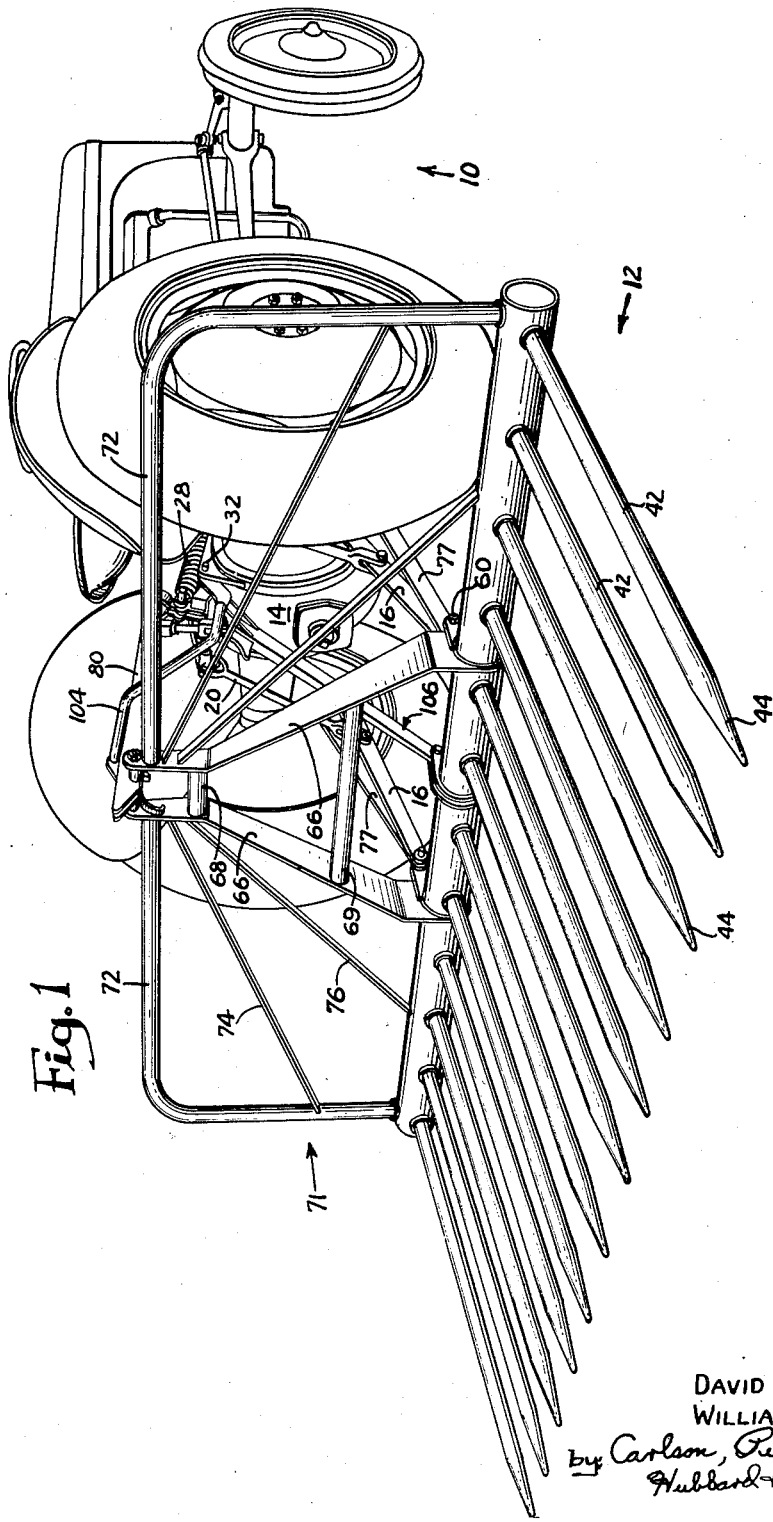
Figure 1 is a perspective view of an exemplary hay sweep or buck rake constructed in accordance with the invention, the illustrated rake being attached to the well-known "Ferguson" tractor.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions and equivalents falling within the spirit and scope of the invention as expressed in the appended claims.

Considered more particularly, the exemplary embodiment, shown in the drawings by way of illustration, comprises a load-lifting implement in the form of a buck or sweep rake 12 (Fig. 1) adapted to be attached to a tractor 10, which will be recognized, by those skilled in the art, as the familiar Ferguson tractor. The tractor 10 comprises a center housing 14 (Fig. 6) mounted between rear axle housings 15. By means of pivot pins 17, two draft links 16 are trailingly pivoted to the lower part of the housing 14, for swinging movement in generally vertical planes. Apertured swivel balls 19 are mounted on the rear ends of the links 16. In order to raise and lower the links 16, the tractor 10 is provided with a power lift device 18 including a pair of drop links 20 having their lower ends pivoted to the draft links 16. The upper ends of the drop links 20 are connected to respective lift arms 22 (Fig. 6) which may be raised and lowered by means of a hydraulic cylinder or ram (not shown) in response to upward or downward movement of a quadrant lever (not shown).

The power lift device 18 may be provided with an automatic draft control 24 (Fig. 2) which may be of the type disclosed and claimed in the Ferguson Patent No. 2,118,180. When an implement such as a plow or the like is used with the tractor 10, the draft control will be effective to regulate the depth of the implement so as to maintain substantially constant draft. Details of the draft control 24 may be learned by referring to the Ferguson patent identified above. Briefly, however, the draft control 24 comprises a stress-responsive element in the form of a forwardly movable control plunger 26 biased against forward movement by means of a strong compression spring 28. The control plunger 26 is adapted to operate a control valve (not shown), which is operatively connected to the hydraulic cylinder of the lift device 18. The control valve and the hydraulic cylinder are so arranged that the application of a predetermined force to the plunger 26 will shift the control valve to a neutral position in which hydraulic fluid will be trapped in the cylinder. In this way, the links 16 will be arrested against further downward movement. Additional force on the plunger will shift the valve to a position in which hydraulic fluid will be admitted to the cylinder under pressure, and the link 16 will thereby be raised. Adjusting the quadrant lever will shift the control point at which the spring-biased plunger 26 will move the valve to its neutral position. In order that an implement may conveniently be attached to the draft control 24, the plunger 26 is connected to the upper part of a rocker or shackle 30 by means of a pivot 31. The rocker 30 is pivoted at its lower end on a long pin 32 mounted on the upper part of the differential housing 14, as described and claimed in the Ernest V. Bunting Patent No. 2,486,257, issued October 25, 1949. Formed on the rocker 30 is an apertured rearwardly projecting portion 36 which provides convenient means for pivotally attaching an implement to the draft control 24.

The buck rake 12, which will serve as an exemplary load-lifting implement to illustrate the invention, comprises a load-supporting element 39 (Fig. 2) having a main cross member 40 which may be tubular as illustrated. Mounted on the cross member 40 are a plurality of long, rearwardly extending tines 42 which may be tubular, as shown. Formed on the tines 42 are pointed rear ends 44 which may be upwardly swept so that the tines will glide easily along the ground without digging in.

The tines 42 may be rigidly and securely mounted on the main cross member 40 by means of a plurality of sleeves 46 (Fig. 3) which extend through diametrical apertures 47 in the cross member 40 and are welded or otherwise rigidly secured to the cross member. Each of the sleeves 46 has an apertured front end wall 48 and the sleeve thus forms a socket adapted to receive the front end of one of the tines 42. Solid axially threaded bushings or plugs 50 are mounted in the forward ends of the tines 42 and welded in place. The tines 42 are secured to the sleeves by means of cap screws 52 which extend through the end walls 48 and are screwed into the bushings 50. To prevent the tines 42 from turning and thus maintain the points 44 in upswept position, the sleeves 46 are provided with keys 54 which may take the form of inward depressions in the walls of the sleeves 46, as shown. The tines 42 are provided with slots 56 which are adapted to interlock with the keys 54. To remove the tines 42 for replacement or repair, it is merely necessary to unscrew the cap screws 52 and withdraw the tines from the sleeves 46.

Provision is made for detachably connecting the buck rake 12 to the tractor 10. In the illustrated arrangement, the load-supporting element 39 of the buck rake 12 may be pivotally connected to the rear ends of the draft links 16 by means of pins 60 mounted on apertured lugs 62 welded to the main cross member 40. The pins 60 are adapted to be inserted through the apertured balls 19 on the links 16. With the links lowered, as shown in Figs. 1 and 2, the cross member 40 will thereby be supported in a somewhat elevated position, while the tines 42 will rest with their upswept points 44 on the ground. Hay lying on the ground may thus be gathered up on the tines simply by backing the tractor. To provide an upper point of pivotal attachment between the load-supporting element 39 and the tractor 10, an upwardly extending A-frame 64 may be mounted on the main cross member 40. As shown, the A-frame 64 comprises a pair of upwardly angling members 66 (Fig. 6) interconnected by upper and lower bracing tubes 68 and 69. An upper pivot pin 70 extends between the upper ends of the members 66.

The load-supporting element 39 is provided with a back frame 71 (Fig. 1) for retaining a load of hay or the like on the buck rake 12. The A-frame 64 is included in the back frame 71 along with a pair of tubular L-shaped members 72 extending outwardly from the upwardly angling members 66 and then downwardly to the main cross member 40. Additional members 74 and 76 extend diagonally across the frame 71.

In order to restrain the buck rake 12 against lateral movement relative to the tractor 10, the buck rake is provided with stabilizing bars 77 connected at their rear ends to the pins 60. The front ends of the stabilizing bars 77 are pivotally connected to brackets (not shown) secured by means of fender bolts (not shown) to the rear axle housings 15 at points spaced outwardly from the pins 17.

Provision is made for releasibly connecting the upper end of the A-frame 64 to the tractor 10. For this purpose the buck rake 12 is provided with an upper hitch link 80 which may comprise two parallel bars 82 secured together in closely spaced relation, as shown in Fig. 6. The front end of the link 80 is adapted to be detachably connected to the control plunger 26 on the tractor 10, in order that the automatic draft control 24 may be employed to regulate the pressure between the tines 42 and the ground. For the purpose of amplifying the force applied to the plunger 26 by the upper link 80, and thereby initiating the lifting action of the power lift device 18 with a comparatively small force in the link 80, the end of the link 80 may be connected to the upper end of a force multiplying lever 84 (Fig. 2) by means of a removable pin 85. At its lower end, the lever 84 may be bifurcated and apertured, for connection to the tractor by means of the long pivot pin 32. An additional pivot pin 86 may be provided for detachably connecting the apertured rearwardly projecting portion 36 of the rocker 30 to an intermediate point on the lever 84.

For the purpose of releasably connecting the upper link 80 to the upper end of the A-frame 64, the implement 12 is provided with a latching mechanism 88 (Fig. 2) which includes the upper cross pin 70. To receive the pin 70, alined downwardly opening notches or slots 90 are formed in the lower edges of the bars 82 making up the link 80. In order to retain the pin 70 in the notches 90, a leaf spring 92 is mounted on the link 80 by means of bolts 94 spaced forwardly from the notch 90. The spring 92 extends rearwardly along the lower edge of the link 80 and thus acts as a resilient closure for the notches 90. In order that the cross pin 70 may readily enter the notches 90, the outer end of the link 80 is formed with an inclined reengaging ramp 96, and the spring 92 is provided with a downwardly curved rear end portion 98 forming an opposed ramp. Mounted on the link 80 is a guide projection or tang 97 (Fig. 7) which projects downwardly through a slot 99 in the spring 92. The tang 97 will arrest the pin 70 against forward movement beyond the slots 90 and will prevent lateral displacement of the spring 92.

To provide for unlatching of the upper link 80 from the pin 70, a cam 100 (Fig. 2) is pivoted on the link 80 by means of a pin 102. Mounted on the cam 100 is a forwardly extending operating handle 104. Raising the handle 104 will disengage the slots 90 from the pin 70 whereupon the load-supporting element 39 of the buck rake 12 will be free to tip rearwardly about the pivot pins 60 at the rear ends of the lower draft links 16. Thus, the latching mechanism 88 may be employed to dump a load of hay previously gathered and lifted by the load-supporting element 39.

The implement 12 may be so constructed that the load-supporting element 39 may be held or latched in raised position so that the weight of the load need not be sustained continuously by the power lift device 18 on the tractor 10. For this purpose, the illustrated embodiment is provided with an extensible member in the form of a telescopic link 106 (Figs. 2 and 6) comprising a sleeve 108 and a rod 110 slidable within the sleeve. At its upper end, the sleeve 108 is provided with a bifurcated and apertured portion 112, adapted to be pivotally connected to the tractor by means of the long pin 32. The lower end of the rod 110 is pivotally connected to the tubular cross member 40 by means of a pin 114 which may extend through a pair of apertured lugs 116 welded to the cross member 40.

Figure 5:
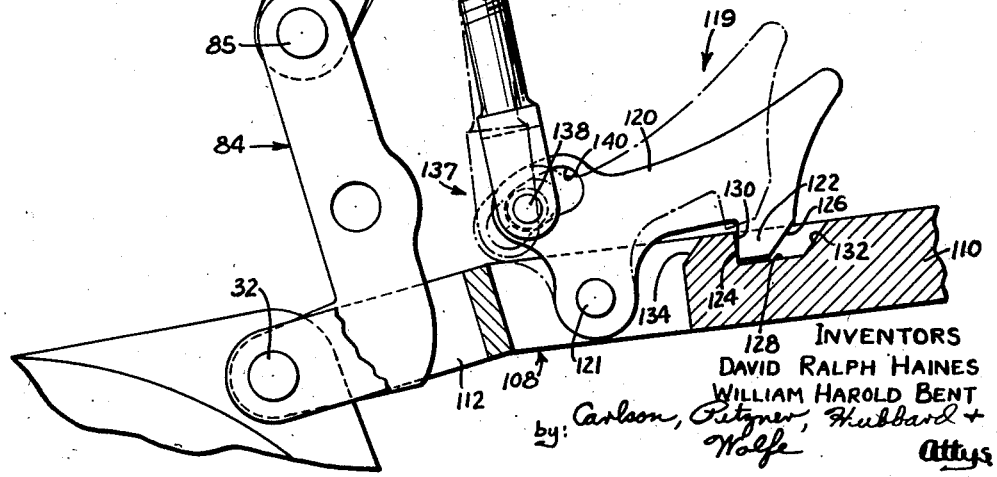
Fig. 5 is a fragmentary elevational sectional view taken along a line 5—5 shown in Fig. 6.

To provide for latching of the sleeve 108 and the rod 110 against extension, the implement 12 has a latching mechanism 119 (Fig. 5), including a latch 120 mounted on a pivot pin 121 carried by one of these elements, in this case the sleeve 108. Formed on the latch 120 is a detent portion 122 having an upwardly and forwardly facing abutment shoulder 124 and an oppositely facing inclined camming surface 126. The rod 110 may be formed with a recess or notch 128 which provides a downwardly facing abutment shoulder 130 adapted to interlock with the shoulder 124 on the latch 120 so as to prevent downward movement of the rod 110 relative to the sleeve 108. Opposite from the shoulder 130, the notch 128 has an inclined camming face 132 adapted to engage the complementary face 126 on the latch and thereby push the latter upwardly out of the notch 128 so that the bar 110 may move upwardly within the sleeve 108 without interference from the pawl. The upper end of the rod 110 is formed with a similar inclined camming surface 134 for rocking the latch 120 upwardly over the end of the rod 110 as the latter moves upwardly into telescoped relation with the sleeve 108.

Provision is made for retaining the upper link 80 in a position such as to facilitate the relatching of the link 80 with the upper pivot pin 70, after the load has been discharged from the load-supporting member. For this purpose, the illustrated implement 12 is provided with a link 136 (Fig. 5) of adjustable length, dependingly pivoted to the upper link 80 and arranged to support the upper link after the latter has been unlatched from the upper pivot pin 70. In order that the latching mechanism 119 may be automatically disabled when the link 80 is unlatched from the load supporting element 39, the lower end of the link 136 is connected to the latch 120 by means of a lost motion connection 137, comprising a pivot pin 138 extending through an arcuate slot 140 in the pawl 120, the slot 140 having the pivot pin 121 as its center of curvature. When the upper link 80 is latched to the pivot pin 70, the link 136 will hang freely from the upper link 80, and the pivot pin 138 will be freely movable in the slot 140 so that the latch 120 may swing on its pivot 121 without interference from the link 136. However, when the link 80 is unlatched from the pivot pin 70 in order to dump the load, the weight of the link 80 will be applied to the latch 120 by means of the depending link 136, so as to swing the latch 120 away from the rod 110 and thereby disable the load-sustaining telescopic member 106. The upper link 80 will swing downwardly slightly so as to disengage the pawl 120, but will then be held in a position such that the upper pivot pin 70 on the A-frame 64 will engage the inclined re-engaging ramp 96 when the draft links 16 are lowered by operating the power lift device 18. Thus, the pin 70 will readily be relatched with the upper link 80.

In order that the implement 12 may readily be hitched and unhitched from the tractor, provision is made for supporting the main cross member 40 in a position corresponding generally to its normal fully lowered position. For this purpose a leg 144 (Figs. 3 and 6) is pivotally mounted on the pivot pin 114. The leg 144 comprises a pair of spaced bars 146 welded to a disc-shaped foot portion 148 adapted to rest upon the ground. The leg 144 is movable between an inoperative, out-of-the-way position, as shown in Fig. 2, and an operative position as shown in Fig. 3. To hold the leg 144 in either of these positions, the rod 110 and the lugs 116 are provided with respective apertures 150 and 152, and the leg bars 146 are formed with apertures 154 adapted to be alined with either the aperture 150 or the apertures 152. The apertures 150, 152, 154 are adapted to receive a removable pin 156 which may be employed to lock the leg 144 in either position. When down, as shown in Fig. 3, the leg 144 will support the cross member 40 at an elevation such that the buck rake 12 may readily be hitched or unhitched.

While the operation of the illustrative embodiment will be understood from the foregoing description, it may be helpful to summarize the operation at this point. The buck rake 12 shown in the drawings finds its principal application in gathering and stacking hay, grass silage, or the like which has been previously mowed and preferably also windrowed. When hay or the like is to be gathered, the buck rake 12 may be lowered by moving the quadrant lever downwardly until the tines 42 engage the surface of the ground. The tractor 10 may then be driven in reverse so that the hay lying on the ground will be swept up onto the tines 42. The upwardly swept pointed ends 44 of the tines 42 will glide readily along the surface of the ground.

As the sweeping operation progresses, a load of hay will accumulate on the load-supporting element 39 adjacent the upright retaining frame 71. The tine points 44 will form a fulcrum so that the weight of the load-supporting element 39 and its load of hay will tend to rock the load-supporting element forwardly about the points 44. As a result, the upper link 80 will be subjected to a compressive force which will be substantially proportional to the pressure between the tines 42 and the ground. In the illustrated embodiment, the compressive force in the upper link 80 may be utilized to operate the automatic draft control 24 on the tractor in such manner that the draft control will regulate the pressure between the tines 42 and the ground. The effectiveness of the action of the draft control 24 is enhanced by the lever 84 which multiplies the force applied to the spring-biased control plunger 26 by the upper link 80.

In actual operation, the quandrant lever on the tractor may be set to a position such that the power lift device 18 will automatically maintain a predetermined pressure between the tine points 44 and the ground. If this predetermined pressure tends to be exceeded, the resulting additional compression of the balance spring 28 beyond the control point will cause the power lift device 18 to raise the buck rake 12 and thereby reduce the ground pressure. Conversely, if the ground pressure tends to decrease below the predetermined value, the power lift device 18 will allow the buck rake 12 to drop under its own weight and that of the load of hay. Thus, sufficient pressure will be maintained between the tine points 44 and the ground to insure that the tine points 44 will closely follow the contours of the ground and to prevent the points from riding up over the hay. On the other hand, the corrective action of the automatic draft control 24 will prevent the development of excessive pressure between the tine points 44 and the ground so that there will be no tendency for the tines 42 to dig into the ground. The exact pressure between the tines 42 and the ground may be adjusted to suit varying ground conditions by changing the position of the quadrant lever on the tractor. Thus the buck rake 12 will operate effectively whether the ground is hard or soft.

Figure 4:
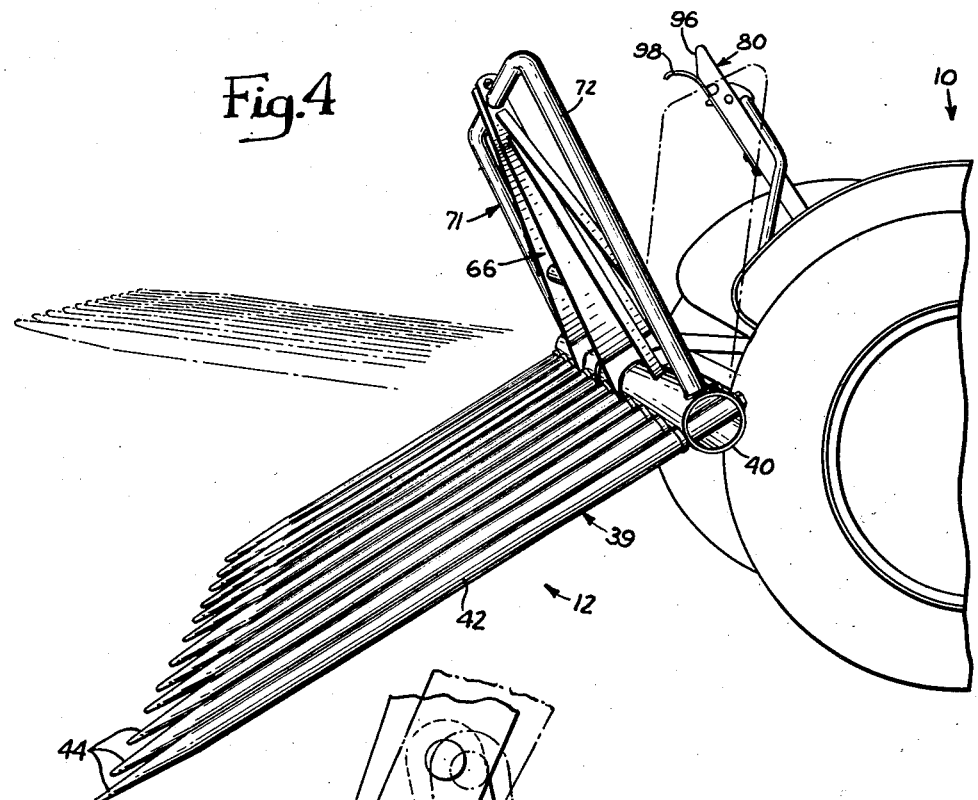
Fig. 4 is a perspective view in which the buck rake of Fig. 1 is shown in full lines in its tilted position and in dot-dash lines in its raised, load-carrying position.

When a full load of hay has been gathered on the load-supporting element 39, the hay may be lifted by raising the quadrant lever on the tractor. The power lift device 18 will then raise the links 16 until the cutoff point is reached, at which the control valve will automatically be shifted to its neutral position, in the manner disclosed in the Ferguson Patent No. 2,118,180. As the links 16 are raised, the load-supporting element 39 will be swung upwardly and rocked forwardly, so that the rearwardly extending tines will be inclined upwardly when the element 39 has been fully raised, as shown in dot-dash lines in Fig. 4. The load of hay will thus be retained by its own weight on the load-supporting element 39. The tractor 10 may then be driven to the hay stack or vehicle upon which the load is to be deposited.

The buck rake 12 and its load of hay may be held mechanically in raised position by the extensible member 106, and in this way the power lift device 18 may be relieved of the weight of the implement 12 and the load. As the implement is raised, the rod 110 will slide upwardly into the sleeve 108. When the implement 12 approaches its fully raised position, the latch 120 will fall into the notch 128. This occurs before the power lift device 18 reaches the cutoff point. If the quadrant lever on the tractor is then lowered to relieve the hydraulic pressure in the hydraulic ram, the shoulder 124 on the rod 110 will move into abutting engagement with the shoulder 130 on the latch 120, and the extensible member 106 will thereby be restrained against extension. Thus, the power lift device 18 will be relieved of the weight of the buck rake 12 and its load, and accordingly there can be no tendency for undue pressures to arise in the hydraulic system on account of bouncing of the implement 12 and the load in transit, for example. Moreover, the mechanical support afforded by the extensible member 106 prevents any such bouncing from actuating the draft control 24, which might tend to produce oscillation of the implement 12.

After being carried to the desired point, the load may be dumped by manually raising the lever 104. This will cause the cam 100 to unlatch the link 80 from the upper cross pin 70. As a result, the load-supporting element 39 will tip rearwardly to the position shown in full lines in Fig. 4. The latch 120 will continue to hold the extensible member 106 in telescoped position and thereby support the cross member 40 and the links 16 in raised position.

The load-supporting element 39 may be relatched to the upper link 80 simply by lowering the draft links 16. To effect this operation, the quadrant lever on the tractor may be raised to energize the power lift device 18 and thereby raise the links 16 slightly. This will relieve the latching pressure between the shoulders 124 and 130. The latch 120 will then be disengaged from the rod 110 by the weight of the upper link 80, acting through the vertical link 136 and the lost motion, pin and slot connection 137. The upper link 80 will swing downwardly a sufficient distance to release the latch 120 but will be held against further downward movement by the link 136. With the latching mechanism 119 disabled, the links 16 may be lowered simply by moving the quadrant lever downwardly. When the tines 42 engage the ground, the load-supporting element 39 will swing forwardly on the pivots 60 and the cross pin 70 will accordingly be swung into engagement with the latch reengaging ramp 96 on the rear end of the upper link 80. Guided by the ramp 96 and the cooperating ramp portion 98 of the spring 92, the pin 70 will move between the spring 92 and the link 80 into the latching slots 90. The relatching of the link 80 with the pin 70 will raise the link 80 and thereby release the latch 120 so that it will again be free to engage the rod 110.

The buck rake 12 may be unhitched by swinging the leg 144 to its lowered position as shown in Fig. 3 and then lowering the links 16 until the leg engages the ground. The implement 12 may then be detached from the tractor 10 by removing the pins 32, 60 and 86. By virtue of the support afforded by the leg 144, it will not be necessary to lift the implement manually when it is again to be hitched to the tractor.

We claim as our invention:

1. In a load-lifting implement for use with a tractor having a pair of rearwardly extending draft links pivoted thereon and a power lift device for raising and lowering the draft links, the combination comprising a load-supporting element having a rearwardly extending portion and a backing frame portion, pivot means for detachably connecting said element to the rear ends of the draft links so that the power lift device may be employed to raise said element, an upper link, pivot means for detachably connecting the front end of said upper link to the tractor, latching means forming a disengageable pivotal connection between the rear end of said upper link and said load-supporting element so that said element may be released for rearward tipping movement, first means for holding said supporting element in elevated position independently of the power lift device, second means for holding said upper link in position for reengagement with said load-supporting element after being unlatched therefrom, and third means operative upon disengagement of said upper link from said load-supporting element for disabling said first means.

2. In a load-carrying implement for use with a tractor having a pair of rearwardly extending links pivoted thereon and a power lift device for raising and lowering the links, the combination comprising a load-supporting element, pivot means for detachably connecting said load-supporting element to the rear ends of the links, an upper link, means for pivotally connecting the front end of said upper link to the tractor, latching means for disengageably connecting the rear end of said upper link to said load-supporting element, first and second members in telescopic engagement, means pivotally connecting said first member to said load-supporting element, means for detachably and pivotally connecting said second member to the tractor, a latch pivotally mounted on one of said first and second members for latching said members against extension and thereby holding said load-supporting element in elevated position independently of the power lift device, said latch having an arcuate slot, a generally vertical link pivotally connected at its upper end to said upper link for supporting said upper link in position to be relatched with said load-supporting element, and a pin in said slot and pivoted on said generally vertical link to form a lost motion connection between said generally vertical link and said latch so that the weight of said upper link will disable said pawl when said upper link is unlatched from said load-supporting element.

3. In a load-lifting implement for use with a tractor having a pair of rearwardly extending links pivoted thereon and a power operated lifting device for raising and lowering the links, the combination comprising a buck rake having a load-supporting element including a generally vertical frame and a plurality of tines extending rearwardly therefrom, pivot means for detachably connecting said frame to the rear ends of the links, so that the lifting device may be employed to raise said load-supporting element, an upper link, pivot means for connecting the front end of said upper link to the tractor, latching means forming a disengageable pivotal connection between the rear end of said upper link and the upper end of said generally vertical frame so that said load-supporting element may be released for rearward tipping movement to dump a load carried thereon, an extensible member connected to said load-supporting element in elevated position, and having means for detachable connection to the tractor, second latching means for latching said extensible member against extension and thereby holding said load-supporting element in lifted position independently of the lifting device, and a generally vertical link pivotally connected to said upper link and connected to said second latching means for supporting said upper link in position for reengagement with said generally vertical frame after being unlatched therefrom, the weight of said upper link being effective to disable said second latching means when said upper link is unlatched from said vertical frame.

4. In a load-carrying implement for use with a tractor having a pair of rearwardly extending links pivoted thereon and a power lift device for raising and lowering the links, the combination comprising a load-supporting element having a generally vertical frame and a load-receiving portion extending rearwardly therefrom, means for detachably pivoting said frame to the rear ends of the links, an upper link, means for detachably pivoting the front end of said upper link to the tractor, self-engaging latch means for disengageably latching the rear end of said upper link to the upper part of said frame and means for limiting the downward movement of said upper link when said latch means are disengaged so that the rear end of said link is properly positioned for re-engagement of the latch means.

5. In a load-carrying implement for use with a tractor having a pair of rearwardly extending links pivoted thereon and a power lift device for raising and lowering the links, the combination comprising a load-supporting element having a generally vertical frame and a load-receiving portion extending rearwardly therefrom, means for detachably and pivotally connecting said load-supporting element to the rear ends of said links so that the lift device may be employed to raise said element, an upper link, means for pivotally connecting the front end of said upper link to the tractor, a transverse upper pivot pin on said generally vertical frame, said upper link having self-engaging latching means adjacent its rear end for disengageably receiving said upper pin, a manually operable cam for disengaging said pin from said latching means so that said load-supporting element will be released for rearward rocking movement, and means for limiting the downward movement of said upper link about its pivot connection to the tractor so that said latching means are located to engage with said upper pin when the load-supporting element is rocked in the opposite direction.

6. In a load-carrying implement for use with a tractor having a pair of rearwardly extending links pivoted thereon and a power lift device for raising and lowering the links, the combination comprising a load-supporting element, means for detachably and pivotally connecting said load-supporting element to the rear ends of said links, an upper link, means for pivotally connecting the front end of said upper link to the tractor, a transverse upper pivot pin on said generally vertical frame, said upper link having a downwardly opening notch adjacent its rear end for disengageably receiving said upper pin, a leaf spring secured to said upper link for retaining said pin in said notch, and a manually operable cam for disengaging said pin from said notch so that said load-supporting element will be released for rearward tipping movement.

7. In a load-carrying implement for use with a tractor having a pair of rearwardly extending links pivoted thereon and a power lift device for raising and lowering the links, the combination comprising a load-supporting element, means for detachably and pivotally connecting said load-supporting element to the rear ends of said links for raising movement thereby, an upper link, means for pivotally connecting the front end of said upper link to the tractor, a transverse upper pivot pin on said generally vertical frame, said upper link having a downwardly opening notch adjacent its rear end for disengageably receiving said upper pin, a leaf spring secured to said upper link for retaining said pin in said notch, a manually operable cam for disengaging said pin from said notch so that said load-supporting element will be released for rearward tipping movement, said spring and said upper link having oppositely inclined rear end portions forming opposed ramps for reengaging said upper link with said upper pin, and means for holding said upper link in position for reengagement with said upper pin.

8. In a load-carrying implement for use with a tractor having a pair of rearwardly extending links pivoted thereon, a power lift device for raising and lowering the links and control means including a stress-responsive element for initiating operation of said lift device in response to the application of a predetermined force to the stress-responsive element; the combination comprising a load-supporting element having a generally upright frame and a plurality of rearwardly extending tines mounted thereon, said tines having respective pointed rear ends adapted to engage the surface of the ground, means for detachably pivoting said frame to the rear ends of the links, an upper link pivotally connected to the upper part of said frame, and means for detachably pivoting the front end of said upper link to the stress-responsive element so that the control means will effect raising movement of the links in response to the development of a predetermined force between said tines and the ground surface.

9. In a load-carrying implement for use with a tractor having a pair of rearwardly extending draft links pivoted thereon, a power lift device for raising and lowering the links, and control means including a stress-responsive element for initiating operation of said lift device in response to the application of a predetermined force to the stress-responsive element; the combination comprising a buck rake having a load supporting element including a generally vertical frame and a plurality of tines extending rearwardly therefrom, means for detachably pivoting said frame to the rear ends of the draft links, said tines having pointed rear ends adapted to engage the surface of the ground, an upper link pivotally connected to said frame, a force-multiplying lever having means for pivotal attachment to the tractor and means for pivotal attachment to the stress-responsive element, means for pivoting the front end of said upper link on the force-multiplying lever so that the control means will be effective to cause the lift device to raise the links in response to the development of a predetermined force between the rear ends of the tines and the ground, said force-multiplying lever being operative to reduce the force necessary between said tines and the ground to initiate operation of the lift device.

10. In a load-carrying implement for use with a tractor having a pair of rearwardly extending links pivoted thereon and a power lift device for raising and lowering the links, the combination comprising a load-supporting element, pivot means for disengageably connecting said load-supporting element to the rear ends of the links for raising said element, an upper link pivotally and disengageably connected to said load-supporting element, means for pivotally connecting the front end of said upper link to the tractor, a pair of elongated members interfitting for relative telescoping movement along their common axis, means for pivotally connecting one of said members to said load-supporting element, means for pivotally connecting the other of said members to the tractor, latch means for releasably holding said members against relative extension for holding said load-supporting element in elevated position independently of the power lift device, and means carried by said upper link for engaging and releasing said latch means when the upper link drops after being disengaged from said load-supporting element.

References Cited in the file of this patent

UNITED STATES PATENTS

| | | |
|---|---|---|
| 925,816 | Long | June 22, 1909 |
| 1,714,643 | Spencer | May 28, 1929 |
| 2,311,671 | Larsen | Feb. 23, 1943 |
| 2,405,980 | Sands et al. | Aug. 20, 1946 |
| 2,418,403 | Grabske | Apr. 1, 1947 |
| 2,478,282 | Kyker | Aug. 9, 1949 |
| 2,479,753 | Luomala | Aug. 23, 1949 |
| 2,505,639 | Eaton | Apr. 25, 1950 |
| 2,530,656 | Fall | Nov. 21, 1950 |
| 2,543,496 | Holopainen | Feb. 27, 1951 |
| 2,616,580 | Olson | Nov. 4, 1952 |
| 2,627,796 | Bunting | Feb. 10, 1953 |
| 2,658,634 | Waller | Nov. 10, 1953 |